US008435357B2

(12) United States Patent
Stopforth

(10) Patent No.: US 8,435,357 B2
(45) Date of Patent: May 7, 2013

(54) TABLET COMPRESSING MACHINE

(75) Inventor: Douglas Stopforth, Halewood Merseyside (GB)

(73) Assignee: BWI PLC, Merseyside (GB)

( * ) Notice: Subject to any disclaimer, the term of this patent is extended or adjusted under 35 U.S.C. 154(b) by 0 days.

(21) Appl. No.: 13/156,743

(22) Filed: Jun. 9, 2011

(65) Prior Publication Data

US 2012/0141623 A1 Jun. 7, 2012

Related U.S. Application Data

(63) Continuation of application No. 12/988,291, filed as application No. PCT/EP2009/054122 on Apr. 7, 2009, now abandoned.

(30) Foreign Application Priority Data

Apr. 16, 2008 (DE) ........................ 10 2008 019 272
Sep. 10, 2008 (DE) ........................ 10 2008 046 670

(51) Int. Cl.
*B08B 9/093* (2006.01)
*B08B 3/02* (2006.01)
*B29C 43/08* (2006.01)

(52) U.S. Cl.
USPC ................ 134/22.1; 134/23; 134/32; 425/86; 425/222; 425/225

(58) Field of Classification Search .................... 425/78, 425/150, 345, 353, 225, 229, 231, 86, 22, 425/317; 264/39, 85, 109–128; 134/22.1–22.19, 134/32, 34
See application file for complete search history.

(56) References Cited

U.S. PATENT DOCUMENTS 3,345,683 A * 10/1967 Eirich et al. .................. 425/222
3,392,688 A 7/1968 Korsch
3,419,147 A 12/1968 Corby
4,518,335 A * 5/1985 Pujari ............................. 425/78
5,032,071 A * 7/1991 Bliss et al. ..................... 425/345
5,156,855 A * 10/1992 Hisatomi et al. ................ 425/86
6,676,863 B2 * 1/2004 Christiaens et al. .......... 264/109
7,404,707 B2 * 7/2008 Warren et al. ................... 425/78

FOREIGN PATENT DOCUMENTS

DE 20 2007 003 176 U1 10/2007
EP 0 823 324 2/1988
EP 0 637 507 A1 7/1996
JP 59 218300 12/1984
JP 62 097799 5/1987

OTHER PUBLICATIONS

International Search Report of PCT/EP2009/054122, mailed Sep. 3, 2010.
International Preliminary Report on Patentability of PCT/EP2009/054122, issued Oct. 19, 2010.

* cited by examiner

*Primary Examiner* — Richard Crispino
*Assistant Examiner* — Thukhanh Nguyen
(74) *Attorney, Agent, or Firm* — McCarter & English, LLP

(57) ABSTRACT

A tablet compressing machine and a process for cleaning a tablet compressing machine with a rotor unit, in which an actuator is provided for the purpose of tilting a sealed housing of the tablet compressing machine, in which the rotor unit, a rinsing unit and the powder supply are disposed, so that the cleaning liquid may drain off horizontal surfaces in the sealed housing. The process therefore comprises the steps of distributing the cleaning liquid, tilting the tablet compressing machine and discharging the cleaning liquid. Retrofitting of existing tablet compressing machines is possible.

18 Claims, 5 Drawing Sheets

TABLET COMPRESSING MACHINE

CROSS-REFERENCE TO RELATED APPLICATIONS

This application is a continuation of application Ser. No. 12/988,291 filed Oct. 15, 2010, now abandoned, which is a U.S. National Stage of International Application No. PCT/EP2009/054122, filed Apr. 7, 2009, claiming priority to German Application no. DE 10 2008 019 272, filed Apr. 16, 2008, and German Application No. DE 10 2008 046 670, filed Sep. 10, 2008, the contents of which are all expressly incorporated by reference in their entirety as part of the present disclosure.

FIELD OF THE INVENTION

The invention relates to a tablet compressing machine with a sealed housing in which a rotor unit and a spraying apparatus are disposed, whereby the spraying apparatus is provided for spraying a cleaning liquid into the sealed housing.

BACKGROUND OF THE INVENTION

Such a tablet compressing machine is known from the document DE 20 2007 003 176 U1. The document DE 20 2007 003 176 U1 describes a tablet compressing machine, in which a cleaning liquid can be distributed, submerging the rotor and wherein ultra-sonic waves can be applied in the sealed housing to cleanse particles off from surfaces. Another tablet compressing machine is known from the document EP 0 637 507 A1. The document EP 0 637 507 A1 describes a method of washing a tablet compressing machine, wherein in a first step a cleaning liquid is distributed. In a second step, a flushing liquid is distributed and the liquid sucked out of the housing. In a third step, all openings of the housing are closed and a vacuum is applied to dry the sealed housing quickly.

Generic tablet compressing machines normally have a rotor unit comprising a die plate, an upper stamp holder and a lower stamp holder. The die plate is provided with a plurality of bores for inserting the upper or lower stamp during rotation. Thereby the upper and the lower stamps compress powdery material into shaped tablets. The upper and lower stamps are movably arranged in axial direction in associated upper and lower stamp holders. After the tablet has been compressed within a bore in the die plate, it is normally pushed out of the corresponding bore of the die plate by the lower stamps. The combination of upper stamps and holders, die plate and lower stamps and holders is called a rotor unit. Generic tablet compressing machines have a capacity of 500 to 25,000 tablets per minute depending upon the number of upper and lower stamps and the speed with which the rotor rotates.

When changing to another batch, that is when the powdery material is changed, for introducing a new powder which is to be compressed, the previous powder must first be completely removed from the machine. No residues of the previous powder should get into the surrounding air, which is why the rotor units in tablet compressing machines are normally encapsulated in a sealed housing. Generic tablet compressing machines are usually equipped with a spraying apparatus by means of which a cleaning liquid such as water may be distributed for removing the residual medical substance. Powder components suspended in air are captured by the spray mist and bound by the liquid, whereupon they sink down and settle on horizontal surfaces of the rotor unit and its vicinity. Powder residues already laying on surfaces are bound in the same way. The cleaning liquid together with the bound powder residues forms puddles on horizontal surfaces which do not drain away. These surfaces may, for instance, be formed on the rotor unit, on ancillary units and parts of the housing. Usually the rotor unit and the spraying facility are at least partially disposed within the sealed housing so that no powder components can pass into the surrounding area during tablet production.

In order to drain the cleaning liquid off the tablet compressing machine it is known in the prior art to provide only inclined, that is non-horizontal surfaces within the tablet compressing machine, thus avoiding the forming of puddles. However, a lot of effort is required to provide only non-horizontal surfaces in such a complicated machine as a tablet compressing machine, in particular when a plurality of components are involved.

This is the state of the prior art on which the invention is based. The invention is aimed at reducing the work and effort involved in constructing and manufacturing a tablet compressing machine.

SUMMARY OF THE INVENTION

It is proposed to provide an actuator for a tablet compressing machine with a sealed housing in which a rotor unit and a spraying apparatus are disposed. The actuator is arranged to at least tilt the sealed housing by a tilting angle $\alpha_{cleanse}$.

The actuator provides for tilting at least the sealed housing by a tilting angle $\alpha_{cleanse}$, so that the cleaning liquid can drain off. The actuator may be arranged so as to tilt the entire tablet compressing machine or only part of it, namely the sealed housing. Existing tablet compressing machines may be fitted with an actuator so that they can be tilted.

A sealed housing does not necessarily have to be a hermetically sealed area, all that is required is that powder cannot penetrate into the surrounding area of the tablet compressing machine.

According to an advantageous further embodiment of the invention a draining channel is provided through which the cleaning liquid may be discharged. Preferably at least one draining channel is provided which is located on that side within the sealed housing, towards which the sealed housing is tilted. The draining channel may be a narrow elongated channel or a simple bore, an active suction device or similar. In the operating position of the tablet compressing machine, namely in the state, in which tablets are produced, the sealed housing is not tilted by the actuator.

The area surrounding the sealed housing is the area, in which the powder is processed into tablets. This is the area which is required to be cleaned. By tilting the sealed housing possibly including the rotor unit to that side on which a draining channel is located, the cleaning liquid cannot form any puddles on horizontal surfaces and can thus drain off. At least the rotor unit, the spraying apparatus and the sealed housing are at least partially arranged on a rack of the tablet compressing machine. The rack may, for example, be a tubular grid frame and/or a plate frame. It should preferably be constructed in such a way as to support the heavy rotor unit. Furthermore the rack may incorporate a spindle, a bearing or a drive for the rotor unit. The rack may comprise the entire tablet compressing machine or may be part of a further rack.

Preferably, the actuator used to tilt the tablet compressing machine is a translationally extending actuator, i.e., a linear drive. In order to allow the cleaning liquid to drain off, the rack enclosing the sealed housing is tilted by means of the actuator. The rack may be a part of the tablet compressing machine or comprise the entire tablet compressing machine. The actuator thus preferably moves in a translational direction and thereby lifts the rack, preferably the entire tablet compressing machine partially, whereby this machine is tilted.

The actuator may be a mass-produced product. It may be an electric motor with a mechanical or hydraulic transmission attached to it, an hydraulic or pneumatic cylinder or a pneumatic lifting pad. This type of actuator is particularly well suited for equipping existing tablet compressing machines with the tilting mechanism of the present invention.

In the tablet compressing machine according to the invention it is possible for the sealed housing and the rotor unit to have horizontal surfaces when in operating position. In the prior art, these horizontal surfaces machines did not allow the cleaning liquid to drain away. With the tablet compressing machine according to the invention which is equipped with an actuator it is not necessary to take into consideration how a liquid can drain away, thereby the work and effort involved in constructing and manufacturing the machine is reduced. Commonly used production processes are simplified by providing right-angled relations between two surfaces, this particularly applies to cylindrical components and housings, leading to cost savings. It goes without saying that not all floors of the tablet compressing machine must be horizontal when in operation position. It is also feasible that at least one of the floors in the sealed housing is inclined to one side. In this case the tilting of the tablet compressing machine has a supplementary effect in draining away the cleaning liquid.

According to an advantageous further embodiment of the invention the rack, in which the rotor unit and the sealed housing are disposed, rests on dampening and suspension elements such as rubber bearings. During the tablet compressing process, rubber bearings dampen and suspend the transfer of solid-borne sound between the tablet compressing machine and the floor on which the tablet compressing machine stands. In this embodiment, in the operating position, that is in the position in which the tablets are produced, the actuator shall preferably be retracted in such a way that there is mechanical decoupling between the rack and the floor and the tablet compressing machine or between the tablet pressing machine and the floor so that the rack or the tablet pressing machine is only resting on the rubber bearings.

Alternatively, according to an advantageous further embodiment of the invention, the actuator itself has dampening and suspension properties and is not lifted off the floor plate in operating position of the tablet compressing machine, but continues to support the weight of the tablet compressing machine. Hydraulic and pneumatic cylinders, for example, have dampening and suspension properties which are dependent upon their piston diameter and their stroke. Their dampening and suspension characteristics may therefore be adjusted via these parameters in a way known to those skilled in the art, in order to meet the dampening and suspension requirements of a heavy tablet compressing machine. If an electro-mechanical actuator is utilized, additional dampening and suspension means may be provided if necessary.

When tilting the tablet compressing machine, preferably, one corner or side of the tablet compressing machine is lifted. According to another preferred embodiment of the invention, the rubber bearings are shaped in such a way as to enable the tilting of the tablet compressing machine. It is not mandatory to provide several rubber bearings, there could also be one single-piece rubber bearing or an elongated rail arranged on the floor surface. The rubber bearings on the side to be lifted or the area of the rubber bearings which are lifted are preferably equipped with means which enable the tablet compressing machine to be returned safely to its original position. For instance, positive guiding into the operating position may be realized by one or several locking pins.

According to an advantageous further embodiment of the invention, the actuator is adapted to at least tilt the sealed housing by a tilting angle $\alpha_{cleanse}$, which typically varies between 1.5 and 4°. The tilting angle $\alpha_{cleanse}$ is selected in such a way that the tablet compressing machine is safely prevented from falling over, in general it will be smaller than 20°. According to the invention it is immaterial whether the entire rack including the rotor unit, the spraying apparatus and the sealed housing is tilted or whether only the sealed housing together with the rotor unit is tilted. The deciding factor is that the actuator is configured in such a way that it tilts the horizontal surfaces enclosed in the sealed housing when the tablet compressing machine is at a standstill, for example during and/or immediately after cleaning.

For safety reasons it is advisable to provide safeguards to prevent the tablet compressing machine from falling over by means of a limiting means. The actuator must not be allowed to extend to the extent where the centre of gravity of the tablet compressing machine, in tilting direction, reaches a point behind an axis about which the tablet compressing machine rotates during tilting. The centre of gravity of the tablet compressing machine is found at a comparatively high level since the rotor unit usually comprises many heavy components and is situated in the upper half of the machine. The person skilled in the art may roughly calculate the tilting angle $\alpha_{max}$, at which the tablet compressing machine is in danger of falling over, by assuming that the centre of gravity is at the very top in the middle, for example. In the tilting direction, this point must not protrude beyond the axis about which tilting occurs. The limiting means may be a positively locking end stop beyond which tilting is not possible. Alternatively, the stroke of the actuator may be limited mechanically or electronically. Combinations of the mentioned limiting means are also possible.

Since tablet compressing machines are usually relatively heavy, powerful actuators are required for lifting the tablet compressing machine, and these would be able to tilt the tablet compressing machine beyond the maximum tilting angle $\alpha_{max}$, which must be prevented to stop the tablet pressing machine from falling over. By providing a mechanical limitation on the tablet compressing machine, for example a clamp, which interacts between a floor plate and the rack, the tilting angle is limited to a maximum tilting angle $\alpha_{max1}$ and the risk of it falling over is eliminated.

According to an advantageous embodiment of the invention, the actuator is provided with a mechanical end stop inherent in the design; on a cylinder these could be, for example, the cylinder faces beyond which the piston cannot be extended. But since the actuator does not have to be a custom made actuator but a mass-produced one, the end stop may be subsequently fitted to the actuator. A clamp, for example, may be attached to a first actuator portion which extends relative to a second actuator portion, whereby the clamp limits the relative extension path, resulting in a further maximum tilting angle $\alpha_{max2}$.

According to an advantageous embodiment of the invention, the tablet compressing machine is provided with a limit stop which switches the actuator off when a maximum defined angle $\alpha_{max3}$ is reached. This is advantageous for actuators having a relatively long extension path. The limit stop prevents the tablet compressing machine from falling over in case of it being wrongly operated.

In addition, the limit stop may be adjustable, for example by a switch which is acted upon by a corresponding piece until operation of the switch stops or vice versa. Preferably, the corresponding piece is adjustable, allowing $\alpha_{max3}$ to be adapted according to the circumstances.

According to a further advantageous embodiment of the invention the tablet compressing machine is equipped with a device for monitoring the tilting angle $\alpha_{tilt}$. This monitoring device may be used to control the actuator. It is also feasible that the actuator is slowed down prior to reaching the tilting angle $\alpha_{cleanse}$ set by the operator so that when the desired tilting angle $\alpha_{cleanse}$ is reached the machine stops without jerking. If a device for monitoring the tilting angle $\alpha_{tilt}$ is used, a maximum tilting angle $\alpha_{max4}$, at which falling over of the tablet compressing machine is safely avoided, can be implemented in a simple manner even without mechanical alterations to the tablet compressing machine.

The angles $\alpha_{max1}$, $\alpha_{max2}$, $\alpha_{max3}$ and $\alpha_{max4}$ may be calculated according to the angle $\alpha_{max}$ in the manner described above, they may also be equal.

It is also feasible to combine the electronic device for monitoring the tilting angle with a mechanical end stop and a mechanical limit stop of the actuator in the tablet compressing machine. The safety is increased by this measure, but it is left to the person skilled in the art, which means he uses to prevent falling over of the tablet compressing machine.

The rubber bearings below the tablet compressing machine dampen and cushion the vibrations occurring in the tablet compressing machine when it is in operating position. If the actuator acts to tilt the entire tablet compressing machine, it can lift the tablet compressing machine in such a way that at least one but possibly also two or more rubber bearings loose contact with the floor. The rubber bearings which remain in contact now bear the weight of the machine together with the actuator.

According to an advantageous further embodiment of the invention, mechanical means are provided on the tablet compressing machine by means of which the supporting rubber bearings are prevented from becoming detached when the tablet compressing machine is tilted. For example, a projection on the rack, which projection is provided on a first locking element, may engage in a recess of a second locking portion arranged on the floor plate so that the detaching movement of the rack relative to the floor plate is limited. This is advantageous because the main load of the tablet compressing machine during tilting continues to act, at least partially, on a rubber block arranged next to the locking arrangement, which deforms during a tilting movement and may become detached. In addition, the mechanical means may serve to define the rotating axis of the tilting movement of the sealed housing. Furthermore, the locking elements ensure that when the tablet compressing machine is lifted from above for positioning it, the floor plate is also lifted.

In order to be able to equip existing tablet compressing machines with the tilting apparatus according to the invention, the retrofit should comprise only a minimum of modifications. It is up to the person skilled in the art to decide whether it is necessary to install the above described locking elements on a tablet compressing machine to be retrofitted as per the invention, so that tilting can be implemented, or whether the design of the tablet compressing machine is sufficient to allow safe tilting without the above described locking elements. If the person skilled in the art decides to install the locking elements, the first locking elements may be attached, for example, on the rack of the tablet compressing machine and the second locking elements may be attached on the floor or on a floor plate. In principle, when retrofitting an existing tablet compressing machine to produce a tablet compressing machine according to the invention, an actuator is installed which acts between the floor of a floor plate and the tablet compressing machine or its rack.

It is advantageous for the rack of the tablet compressing machine to be decoupled from the floor plate in such a way that the tablet compressing machine only rests on the rubber bearings. To this end the actuator may retract in such a way that when the tablet compressing machine is in operating position, it does not lead to any mechanical coupling between the floor plate and the rack.

DETAILED DESCRIPTION OF EMBODIMENTS OF THE INVENTION

Figure 1:
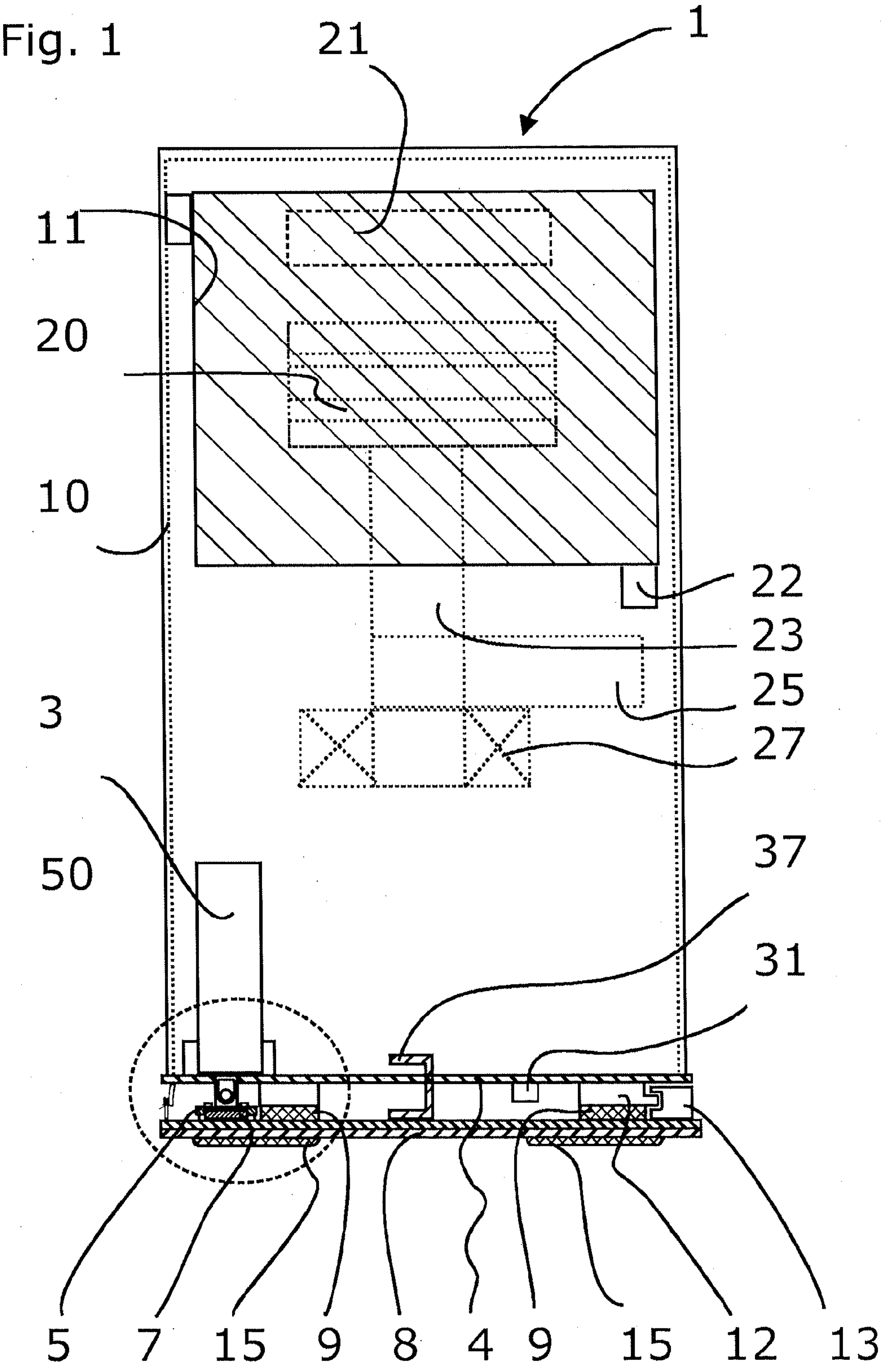
FIG. 1: shows a side view of a tablet compressing machine according to the invention with an actuator.

In FIG. 1 a side view of a tablet compressing machine with a sealed housing 11 comprising a spraying apparatus 21 and a rotor unit 20 is shown. The rotor unit 20 is mounted in a bearing 27 and connected with a drive 25 via a rotor spindle 23. The arrangement of the sealed housing 11, the rotor unit 20, the spraying apparatus 21, the rotor spindle 23, the drive 25 and the bearing 27 is arranged on a rack 10 which provides stability. The rack 10 is suitable for supporting the above mentioned elements and/or for mounting them and may be a tubular grid frame or an arrangement of metal sheets.

The spraying apparatus 21 is designed to distribute a cleaning liquid within the sealed housing 11. After the spraying apparatus 21 has distributed a cleaning liquid within the sealed housing 11, the cleaning liquid drains into a draining channel 22. According to the invention draining of the cleaning liquid into the draining channel 22 is supported by the actuator 3 tilting the rack with the sealed housing 11 including the rotor unit 20 arranged thereon at least partially and the spraying apparatus 21 towards the draining channel 22.

During production of the tablets, which is performed within the rotor unit 20 and which is not described here in further detail, the rack 10, in which the sealed housing is arranged, rests on at least one rubber bearing 9. The rubber bearing 9 is designed to dampen the vibrations occurring during operation of the tablet compressing machine 1. The tablet compressing machine is illustrated in FIG. 1 as a side view, resting on four bearings.

Also with reference to FIG. 1, the tablet compressing machine 1 has a floor plate 8. This is pivitally linked with the rack 10 via at least one rubber bearing 9, illustrated on the right. While the tablet pressing machine 1 is in use and it is not tilted, the rack 10 also rests on at least one further rubber bearing 9, as illustrated on the left. The rack 10 also has a base plate 4 on which a first locking element 12 is arranged which is designed to engage in a recess on a second locking element 13. The second locking element 13 is arranged on the floor plate 8. The locking elements 12, 13 serve to prevent the rubber elements 9 from becoming detached when the tablet compressing machine 1 is tilted. In addition, the locking elements 12, 13 define the rotating axis of the tilting movement of rack 10 in relation to the floor plate 8 and ensure that the tablet compressing machine 1 can be lifted in one piece from above without the floor plate 8 falling off or being connected by actuator 3 to the rack 10 only.

The actuator 3 is adapted to act upon a base 7, which is preferably pivitally linked with the actuator. The base 7 is enclosed within a holding-down element 5. The holding-down element 5 is mechanically connected with the floor plate 8, for instance by means of a screw. According to the variant shown, the end of the actuator 3 is further connected to the rack 10. If the person skilled in the art chooses another variant, in which the actuator 3 is connected to the floor plate 8 without a clearance, the holding-down element 5 may be arranged on the rack 10 and the actuator 3 may be connected with the floor plate 8. In this case, the base 7 is meant to be an element, by means of which actuator 3 may exert a force upon the floor plate 8. Therefore, the base 7 is mechanically linked to the actor and has a substantially flat contact surface. Preferably, the base 7 is pivotally linked with one end of a first actuator portion 17, in order to compensate the changeable angle relationships between floor plate 8 and actuator longitudinal axis during tilting.

In principle, a floor plate 8 is understood to be an element on which the tablet compressing machine 1 stands. It need not have the shape of a plate but may be a grid frame or similar. If the room in which the tablet compressing machine 1 is installed, is provided with a machine bed, the floor plate 8 may be this machine bed. The deciding factor is that the actuator 3 can be supported between the tablet compressing machine 1, for example its rack 10, and the floor plate 8.

In FIG. 1, a retention clamp 37 is, for example, arranged on the floor plate 8, which grips the base plate 4 of rack 10 with a certain amount of clearance. When the tilting angle $\alpha_{tilt}$ reaches a maximum tilting angle $\alpha_{max1}$, the retention clamp acts as a mechanical stop. Limiting the tilting angle to $\alpha_{max2}$ and $\alpha_{max3}$ is the subject of the description with reference to FIGS. 3 and 5, respectively. At this point it should only be mentioned that $\alpha_{max2}$ is limited by a mechanical limitation of the extension path of actuator 3 and that $\alpha_{max3}$ is limited by an electronic limit stop of actuator 3. The angles $\alpha_{maxi}$, (i=1; 2; 3; 4) do not have to be equal, rather the deciding factor is that the tablet compressing machine 1 is not tilted any further once one of the angles has been reached.

With further reference to FIG. 1, a tilting angle detection unit 31 is schematically shown for measuring the tilting angle $\alpha_{tilt}$. The actuator 3 may have its own control so that the tablet compressing machine 1 is automatically tilted at a preprogrammed tilting angle $\alpha_{cleanse}$. Alternatively, the actuator 3 could move as a result of the operation of a push button, whereby a corresponding push button is not necessarily arranged on the tablet compressing machine. When the tilting angle αtilt reaches a tilting angle $\alpha_{max4}$, at which angle there is a risk of the tablet compressing machine falling over, the actuator 3 is stopped, even although the operator continues to hold the push button down.

Figure 2:
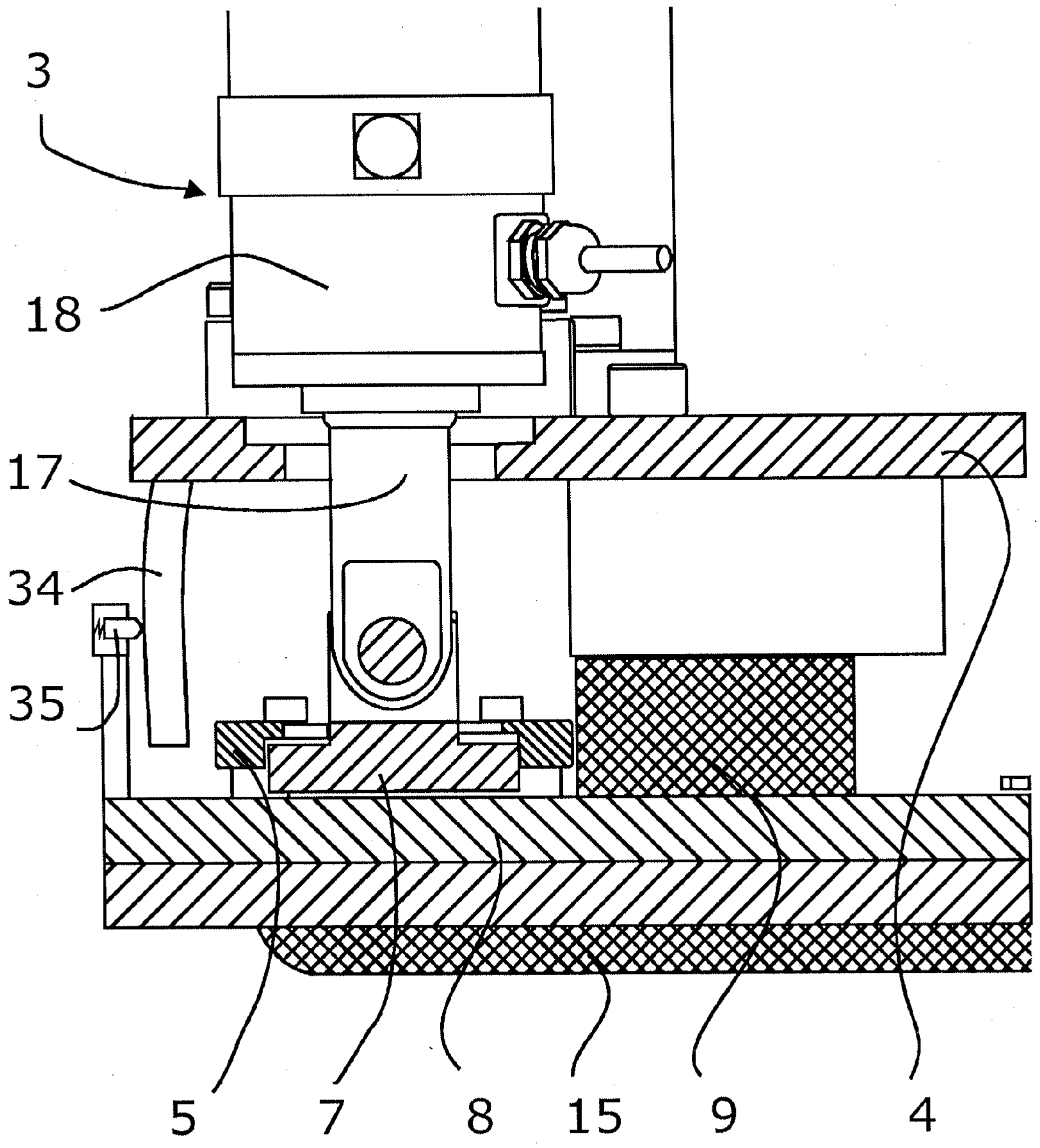
FIG. 2: shows an enlarged section of FIG. 1, FIG. 3: shows the section of FIG. 2, the difference being that a part of the tablet pressing machine has been tilted.

FIG. 2 shows the area designated 50 in FIG. 1 in greater detail. The actuator 3 acts with a first actuator portion 17 upon the floor plate 8 via the base 7. To this end, a force is created within the actuator 3 in the known manner, that is hydraulically, pneumatically or electro-hydraulically, between the first actuator portion 17 and a second actuator portion 18, which is suitable to lift one side of the tablet compressing machine 1 in order to tilt it. The construction of an hydraulic or pneumatic cylinder is known and does not require explanation, an electromechanical drive may be a spindle drive.

In FIG. 2, the tablet compressing machine 1 is in operating position in which the base 7 does not contact of the floor plate 8. This is necessary for NVH reasons, since otherwise the actuator 3 could transmit vibrations from the tablet compressing machine 1 to the floor plate 8.

Preferably, contact elements 15 are arranged below the floor plate 8, which are preferably manufactured from plastic or rubber. These may comprise compressed air connections (not shown) on their underside so that when the tablet compressing machine 1 is acted upon by compressed air, it hovers on an air cushion and may be moved easily.

Preferably, the holding down element 5 is connected to the floor plate 8 so that movement of the base 7 in the holding-down element 5 is limited in vertical direction. Furthermore, a switch 35 and a corresponding piece 34 are schematically shown. These two elements can be used to make up a limit stop. A switch 35 is connected to the floor plate 8, whilst the corresponding piece 34 is connected to the base plate 4. When the actuator 3 tilts the rack 10 of the tablet compressing machine 1, the switch is operated when the maximum tilting angle $\alpha_{max3}$ is reached, thereby closing or opening an electrical contact, creating a signal which stops the actuator. Preferably, at least one of the switch 35 and the corresponding piece 34 are formed in such a way that adaptation of the tilting angle $\alpha_{max3}$, at which the limit stop is operated, can be performed easily. When the limit stop is operated, the actuator 3 is stopped thereby preventing the tablet compressing machine 1 from falling over.

Figure 3:
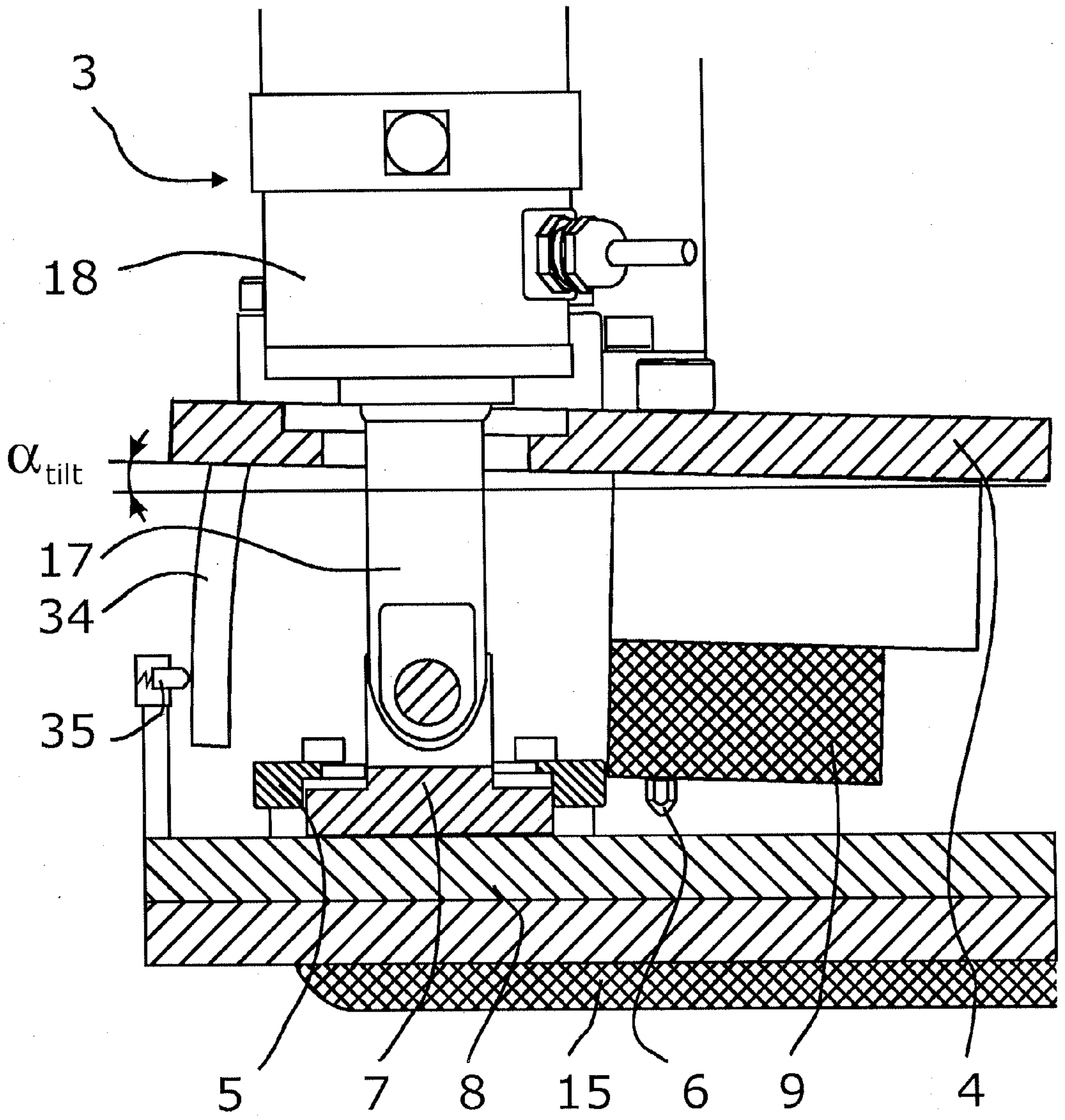

FIG. 3 shows the area 50 of FIG. 1, in which the actuator 3 is shown as being partially operated, i.e., the actuator portion 17 is shown in an extended position. The tablet compressing machine 1 is tilted by the angle $\alpha_{tilt}$, the base 7 touches the floor plate 8.

In this view of a tilted tablet compressing machine 1, the reader can see a locking pin 6, which is preferably attached to the rubber element 9. This ensures in combination with a recess in floor plate 5 (not shown), that the rubber element 9 always comes to rest in the same place, when the tablet compressing machine 1 is tilted back into the operating position, that is when the tablet compressing machine 1 is returned safely into its original position.

Figure 4:
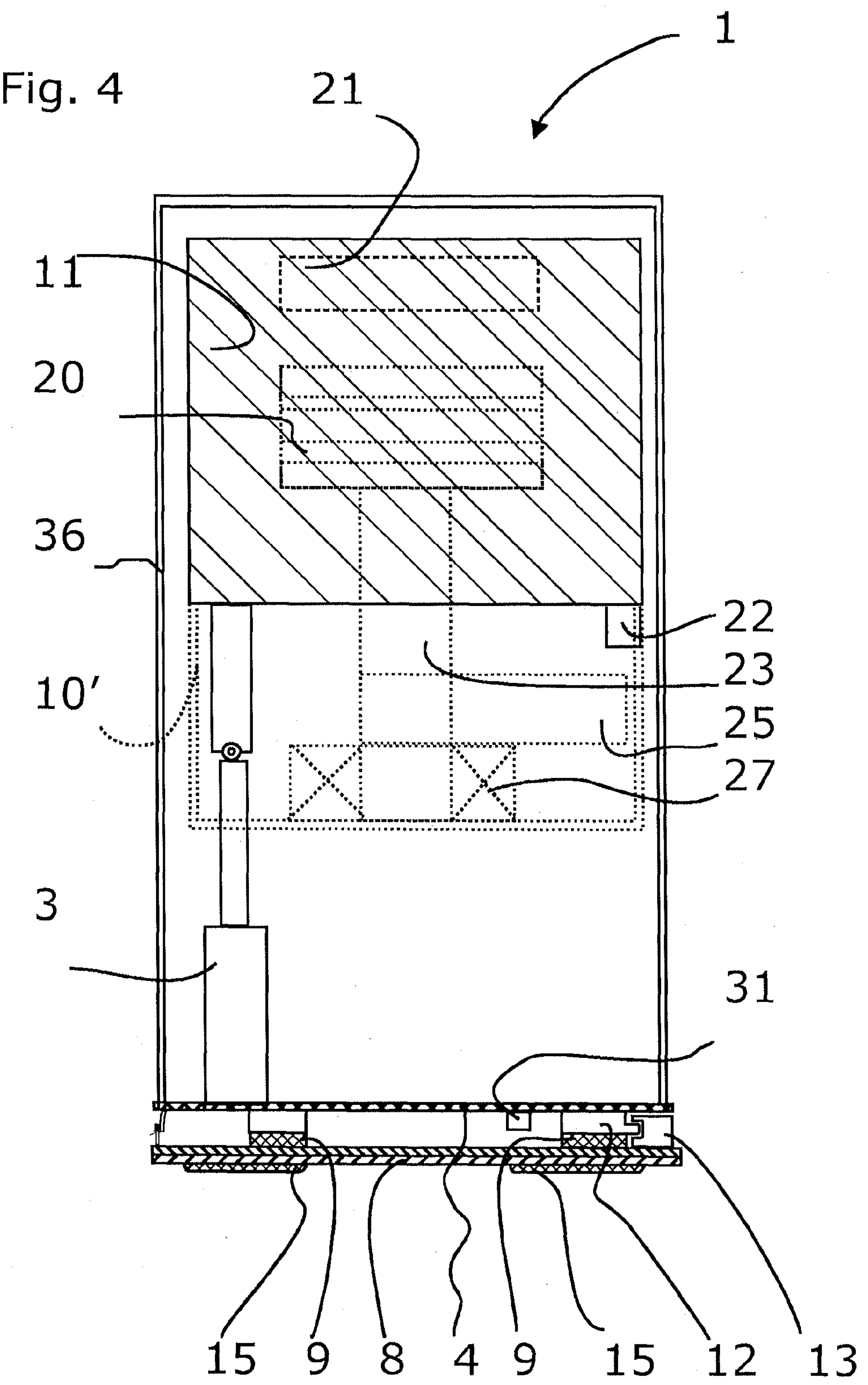
FIG. 4: shows a further tablet compressing machine according to the invention in which only parts of the tablet pressing machine can be tilted.

In contrast to FIG. 1, a rack 10' is arranged in a frame 36 in the embodiment shown in FIG. 4. The frame 36 may be a tubular grid frame. The rack 10' is defined in the same way as the above described rack 10, as an element which is suitable for supporting the rotor unit 20 mounted in a bearing 27 and connected via a rotor spindle 27 to a drive 25. The combination of the sealed housing 11, the rotor unit 20, the spraying apparatus 21, the rotor spindle 23, the drive 25 and the bearing 27 is arranged on or in the rack 10', which ensures mechanical stability. The rack 10' may be a tubular grid frame or a combination of metal sheets. The rack 10' is housed inside frame 36 in such a way that it can be tilted in direction of frame 36 when the actuator 3 is operated. The frame 36 is designed in such a way as to be able to support the rack 10'. The frame 36 is stationary and is not tilted. Instead of tilting the entire tablet compressing machine 1, only rack 10' is tilted towards frame 36, i.e., only a part of the tablet compressing machine 1 is tilted. In the embodiment shown in FIG. 4, the actuator 3 is effective between base plate 4 and rack 10'.

Figure 5:
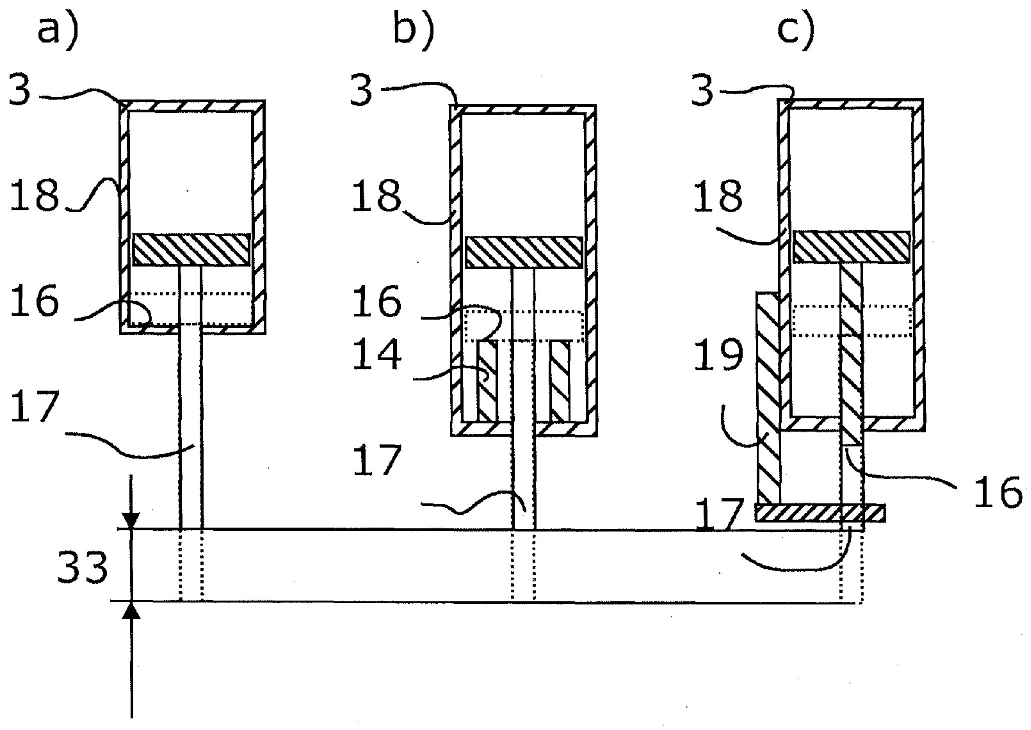
FIG. 5: shows three variants of an actuator with a mechanical end stop.

With reference to FIG. 5, three examples representing a possible end stop 16 of actuator 3 are shown. An end stop 16 is provided to prevent the tablet compressing machine 1 from falling over in case of misoperation or defect. The tilting angle $\alpha_{tilt}$ is limited to a maximum tilting angle $\alpha_{max2}$ It is advantageous to use a mass-produced linear drive to act as an actuator 3 which is not necessarily equipped with a stop inherent in the design. Here the actuator 3 is depicted as a hydraulic cylinder because it simplifies the illustration of an end stop 16. The variants in the embodiments, however, can also be equipped without problems with an electro-mechanical drive with a spindle or a toothed rack.

The broken lines are representative of the positions of the first actuator portion 17 when it reaches the end stop 16. The actuator 3 is advantageously limited in its extension path 33. For example, for a 2 m high, 1 m deep and 1 m wide tablet compressing machine 1 an extension path 33 of less than 5 cm is sufficient in order to realize a tilting angle of $\alpha=3°$. If the centre of gravity is unfavorable and the rubber bearings 9 or locking elements 12, 13 are positioned further towards the inside, the tablet compressing machine 1 could be in danger of falling over at only 12°, and therefore the extension path 33 of actuator 3 should not be larger than 20 cm. An extension path 33 of this length is not mandatory, so that limiting the extension path to 10 cm should be sufficient as a rule.

In FIG. 5*a* an element of the first actuator portion 17 is stopped when it reaches the end stop 16 within the second actuator portion 18. Where a hydraulic or pneumatic actuator 3 is used, the piston in this case abuts against the cylinder wall.

In FIG. 5*b* an alternative design of an end stop 16 is shown. Here the extension path 33 may be limited by a sleeve 14, which prevents the first actuator portion 17 from extending any further when the extension path 33 is reached.

FIG. 5*c* shows a similar design, here the extension path 33 of the actuator 3 is limited by means of a clamp 19.

A person skilled in the art will, however, has many other prior art mechanical limiting means at his disposal.

The invention claimed is:

1. A tablet compressing machine comprising:

a sealed housing having a rotor unit and a spraying apparatus disposed therein, wherein the spraying apparatus is adapted to distribute a cleaning liquid within the sealed housing, and an actuator, adapted to tilt one of (i) the sealed housing, and (ii) the entire tablet compressing machine by a tilting angle of at least $\alpha_{tilt}$.

2. A tablet compressing machine according to claim 1, further comprising at least one draining channel inside the sealed housing and adapted to receive the cleaning liquid.

3. A tablet compressing machine according to claim 1, further comprising a floor plate and a rack, whereby the sealed housing is either attached to the rack or is a part of the rack and the actuator is adapted to act between the floor plate and the rack.

4. A tablet compressing machine according to claim 3, further comprising at least one rubber bearing arranged at least partially between the rack and the floor plate, wherein, in an operating position of the tablet compressing machine, the rack rests on the at least one rubber bearing, wherein the at least one rubber bearing is adapted to permit said tilting.

5. A tablet compressing machine according to claim 3, further comprising at least one rubber bearing arranged at least partially between the rack and the floor plate, wherein, in an operating position of the tablet compressing machine, the rack rests on the at least one rubber bearing and the actuator, wherein the at least one rubber bearing is adapted to permit said tilting, and wherein the actuator has dampening characteristics.

6. A tablet compressing machine according to claim 1, wherein the tilting angle of $\alpha_{tilt}$ is no more than about 20°.

7. A tablet compressing machine according to claim 1, wherein the tilting angle $\alpha_{tilt}$ is limited by mechanical limiting means to a maximum tilting angle $\alpha_{max2}$.

8. A tablet compressing machine according to claim 7, further comprising a limit stop, which is triggered upon reaching an inherent end stop of the actuator.

9. A tablet compressing machine according to claim 1, further comprising a limit-stop switch adapted to switch the actuator off upon reaching a maximum tilting angle of $\alpha_{max3}$.

10. A tablet compressing machine according to claim 1, wherein the actuator further comprises a control, adapted to tilt the tablet compressing machine at a preprogrammed tilting angle.

11. A tablet compressing machine according to claim 1, wherein the actuator is configured to extend to tilt the tablet compressing machine.

12. A tablet compressing machine according to claim 11, wherein the actuator is configured as an electro-mechanical, hydraulic or pneumatic linear drive.

13. A tablet compressing machine according to claim 1, wherein the actuator comprises a pneumatic lifting pad, which is suitable to extend in at least one direction, when acted upon by pressure.

14. A method of cleaning a sealed housing of a tablet compressing machine comprising the following steps:

a) distributing a cleaning liquid within the sealed housing, and b) tilting at least the sealed housing by a tilting angle $\alpha_{tilt}$ to discharge the cleaning liquid.

15. A method according to claim 14, wherein the tilting step is performed by an actuator.

16. A tablet compressing machine according to claim 1, wherein the tilting angle is between about 1.5° and about 3°.

17. A method according to claim 14, wherein the tilting step comprises tilting the entire tablet compressing machine by the tilting angle $\alpha_{tilt}$.

18. A method of according to claim 17, wherein the tilting step is performed by an actuator.

* * * * *